(12) United States Patent
Nowatzyk

(10) Patent No.: US 6,262,823 B1
(45) Date of Patent: Jul. 17, 2001

(54) SYSTEM FOR OPTICAL TIME DOMAIN MULTIPLEXING OF DIGITAL SIGNALS

(75) Inventor: Andreas Georg Nowatzyk, Mountain View, CA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/075,751

(22) Filed: May 11, 1998

(51) Int. Cl.[7] .................................................. H04J 14/08
(52) U.S. Cl. ........................ 359/140; 359/123; 359/158; 359/180; 359/193
(58) Field of Search .................................. 359/140, 158, 359/123, 180, 193

(56) References Cited

U.S. PATENT DOCUMENTS

| | | | | |
|---|---|---|---|---|
| 3,604,936 | * | 9/1971 | Kompfner | 250/199 |
| 4,427,895 | * | 1/1984 | Eng | 250/551 |
| 5,493,433 | * | 2/1996 | Prucnal et al. | 359/123 |
| 5,535,032 | * | 7/1996 | Bottle | 359/140 |
| 5,636,045 | * | 6/1997 | Okayama et al. | 359/140 |
| 5,953,142 | * | 9/1999 | Chiaroni et al. | 359/127 |
| 5,986,784 | * | 11/1999 | Kersey et al. | 359/122 |

OTHER PUBLICATIONS

Nowatzyk et al. ; Are Crossbars Really Dead? The Case for Optical Multiprocessor Interconnect Systems; ACM; pp. 106–115; 1995.

Nowatzyk; "A Communication Architecture for Multiprocessor Networks" Thesis; Apr. 1989.

* cited by examiner

Primary Examiner—Leslie Pascal
Assistant Examiner—Hanh Phan
(74) Attorney, Agent, or Firm—Leah Sherry; Justin Boyce; Oppenheimer Wolff & Donnelly LLP

(57) ABSTRACT

In a system for communicating optically encoded data among a network of nodes, the nodes are connected to each other by optical transmit and receive fibers. Each node includes a laser, a transmitter, and a receiver connected to the transmitters of the other nodes by a fiber stretcher. The rate at which the laser generates light pulses is controlled by a frequency control signal supplied to an oscillator connected to the laser. The delay from the transmitters to the receivers is controlled by a phase control signal supplied to the fiber stretcher connected to the receive fiber. The transmitter connected to the transmit fiber selective delays the pulses into a plurality of time multiplexed channels. The receiver connected to the fiber stretcher selectively detects the pulses in the time multiplexed channels while all of the pulses of all of the nodes are globally synchronized in all of the time multiplexed channels in frequency and phase using the frequency and phase control signals.

30 Claims, 12 Drawing Sheets

SYSTEM FOR OPTICAL TIME DOMAIN MULTIPLEXING OF DIGITAL SIGNALS

FIELD OF THE INVENTION

This invention relates generally to optical signaling, and more particularly to time multiplexing optical signals.

BACKGROUND OF THE INVENTION

Single mode, fiber-optic cables have an inherent theoretical bandwidth that is more than a thousand times higher than that of electrical cables. One optical fiber could potentially carry a data stream at about ten Tera-bits per second. This is more than the total bandwidth of electronic switches used to interconnect multiple computers (hosts or "nodes") in high end servers, such as Digital's Memory Channel, IBM's SP-2 family of super-computers, and SGI's Cray T3E. Therefore, systems of "nodes" interconnected by fiber-optic cables are ideal for a very high performance system area networks (SAN), network of workstations (NOW), multi-processor communication subsystems, Internet switches, routers, and the like.

However, data are generally produced by electronic systems and need to be delivered at their destination in electronic form. Consequently, the theoretical bandwidth of a fiber-optic cable is not directly attainable because of the limitation imposed by the need to convert between signaling in the electrical domain and signaling in the optical domain. This is analogous to trying to pump water through a fire hose that is connected to straws at each end.

The general structure of an optical communication system 100 is depicted in FIG. 1. At a transmitting side, multiple, independent data streams, each of which operates at a speed attainable by electronic means, for example a source node 10, are provided on multiple input channels 101. An optical multiplexer 110 combines the multiple data streams onto a single optical transmission medium 115, generally a fiber-optic cable. At the receiving side, a demultiplexer 120 separates the combined data steam into multiple, independent data streams that are subsequently delivered to their intended destination 20 via output channels 102.

It should be noted that both the multiplexer 110 and the demultiplexer 120 may actually include a number of independent components, each responsible for only one data stream. It is further possible to combine or split the signal on the transmission medium 115 into several parts. In the case where the signals are split, each part contains all of the combined information, hence passively distributing an optical signal to multiple destinations is functionally equivalent to broadcasting.

FIG. 2 shows the schematic for the equivalent broadcasting system 200 with input channels 201, multiplexers 210, optical broadcast medium 215, demultiplexers 220, and output channels 202. The electronic nodes are not depicted.

To overcome the intrinsic limitations of the electro-optical interfaces, it is possible to multiplex multiple, independent data streams onto one fiber by using multiple different wavelengths, or by interleaving data in time. The first technique is called wavelength division multiplexing (WDM), and the second technique is called optical time domain multiplexing (OTDM). There are also other forms of optical multiplexing techniques under investigation, for example, ones based on spread-spectrum techniques, however, WDM and OTDM are the only techniques that have currently been reduced to practical applications.

Wavelength division multiplexing is similar to a conventional broadcast system. There, the electromagnetic spectrum is divided into multiple channels with a different frequency assigned to each channel. The transmitters and receivers can selectively operate on specific channels while sharing the same transmission medium without interference. Fiber-optic transmission systems using WDM have been demonstrated with up to 128 channels.

However, WDM systems are rather costly because they require highly frequency-stable lasers on the transmitting side, and very selective filters on the receiving side. Moreover, at this point in time, WDM systems either cannot change channels at all, or require a relatively long time to tune the transmitters and receivers to different frequencies, as long as many milli-seconds.

As an advantage, WDM system can operate over very long distances, and are ideal for wide area networks (WANs), telephony, cable TV systems, etc. WDM systems are not compelling at the system area network level due to their high cost, a limited number of channels, and their limited ability to switch channels. Because WDM systems cannot easily reallocate bandwidth to meet rapidly changing demands, they are best suited in situations with fairly static communication patterns.

FIG. 3 is a timing diagram of an optical domain multiplexed broadcast signal 300 for an example eight node network. A system that can produce the signal 300 is described below with reference to FIG. 4. In FIG. 3, time is indicated along the x-axis 301, and the relative intensity (amplitude) of the signal 300 is indicated along the y-axis 302. In the broadcast signal 300, pulses 310, 320, 330, 340, and so forth, are called framing pulses, and pulses 311–318 are data pulses, i.e., there are eight data pulses for each framing pulse.

Logical ones and zeros are respectively indicated by solid and open data pulses, i.e., the presence or absence of light pulses. The framing pulses are always ones. Generally, the framing pulses have a greater intensity than the data pulses so that they can readily be discerned. The rate of the framing pulses determines the bit rate of the network. The relative offset of the data pulses with respect to the framing pulses determines the OTDM channels to which transmitters and receivers can tune.

As shown in FIG. 4, the data from many sources are sequentially interleaved on a single medium, for example, an optical fiber. Because the system operates with a fixed bit rate (frequency), the time between two consecutive bits from the same source is a constant: the bit-time. The bit-time is the inverse of the transmission rate of each channel.

The data from all channels are transmitted sequentially, starting with the first bit of channel "0" (311), the first bit of channel "1" (312), etc. After the first bit from all channels have been sent, the cycle repeats with the next bit, and so on. The total number of channels in the system is a constant. The bit-time multiplied by the number of channels determines the total bandwidth of the system (total bit rate (TBR). The framing pulses delineate the channel multiplexing sequence. For example, each framing pulse may precede the data from channel "0." Each receiving node in the system can use the framing pulses to synchronize its selection mechanism based on a relative time offset from the framing pulses.

Because of the speeds involved, multiplexing and demultiplexing must be performed optically. Each transmitting node must insert a data bit in its assigned channel time slot, similarly, each receiver extracts its data from one of the channel time slots. As an advantage, an OTDM system can utilize many channels, and it is possible to change channels quickly, for example, in a few nano-seconds as opposed to many milli-seconds for an WDM system. In other words, changing channels in an OTDM system can be about a million times faster than changing channels in a WDM system). As is the case for a WDM system, the multiplexing and demultiplexing functions can be distributed such that each device that is interconnected has one multiplexing and one demultiplexing device as part of its network interface. Such a configuration is shown in FIG. 4.

FIG. 4 shows the basic structure of an optically coupled network 400 that can produce the multiplexed signals as shown in FIG. 3. This system is disclosed in U.S. Pat. No. 5,493,433 issued to Prucnal et al. on Feb. 20, 1996. Framing pulses as shown in FIG. 3 are generated by a single modelocked, pulse compressed laser source 413 of a "hub" 410. The pulse rate is equal to the bit rate that is used by each of the attached nodes, for example, 1.3 Gbits/sec. The pulse width of each light burst is considerably smaller, e.g., about one pico-second. The laser 413 acts as a central timing clock with sparse framing pulses. As described above, the empty spaces between the timing pulsing are filled with the data of the various broadcast channels synchronized to the framing pulses.

The centralized hub 410 has an input side 411 connected to an output sides 412 by an optical medium 414. The hub 410 connects the various nodes in the network. The hub 410 is configured as a passive power splitter that distributes the light pulses through it equally to all attached nodes. It should be noted that using a single laser source makes the amount of signal received by any one node inversely proportional to the number of connected nodes. In a network of 50 nodes, each node receives about 1/50 of the crucial framing pulses to synchronize data pulses on the various channels.

Each node has a receive section 401 connected to the output side 412 of the hub 410, and a transmit section 402 connected to the input side 411 of the hub 410. The input side 411 of the hub 410 can be connected to any output side connection via the medium 414 to complete any arbitrary loop between any node transmitter 402 and any node receiver 401, including itself. In other words, the system can act as a cross-bar switch or a broadcast system.

In the receive section 401, the optical signal is passed through an optical signal separator 420. The separator 420 separates the framing pulses from the data pulses, for example, according to their polarization. The framing pulses are passed through on lines 424 and 434, and the data pulses are fed to a first optical delay element 421. A particular receive channel (RxChannel#) is selected by a delay signal on line 422.

The output of the delay element 421, as well as the framing pulses on line 424, are fed to an optical AND gate 425. When the selected channel's data pulses are time aligned with the framing pulses on line 424, signals are produced on the line 428. These signals are fed to a photo-detector (DET) 426 to produce received data (RxData) as an electronic bit stream on line 427.

The transmit section 402 operates as follows. A bit stream (TxData "1011011") is supplied on line 435. The bit stream is converted to optical signals by a modulator 436 which also receives the framing pulses on line 434. A particular transmit channel (TxChannel#) is selected by line 432 connected to a second delay element 431.

The delay element 431 inserts the data signals at the appropriate time displacement between the framing pulses. From the delay element 431, the optical signal is presented to the input side of the central hub 413 where the light bursts are combined with those transmitted by other nodes. The combined broadcast signal 300 as shown in FIG. 3 is subsequently distributed to all nodes.

As a feature of this transceiver arrangement, all devices that are operated by electronic signals only need to operate at the channel bit rate. On the optical broadcast medium itself, the data bits are fitted in the time multiplexed channels between the framing pulses as shown in FIG. 3. In addition, the synchronicity inherent in an OTDM protocol allows for efficient control and arbitration operations. Every operation can be tuned to the same timing signal.

However, there are some problems with this arrangement. Because only a single centralized laser is used for all framing pulses, the arrangement requires a large dynamic range and good extinction ratio of the optical AND gate, both of which are difficult to achieve. This limits the total number of nodes that can concurrently transmit and receive. It is relatively difficult to extract the framing pulses from the input data stream, particularly when the exact required orientation of the planes of polarization of the framing and data pulses is lost due to uncontrollable bifringence in the fiber. In order to increase the number of nodes in the network, a considerable more expensive laser needs to be used, regardless of how many nodes are actually present.

The pulses must be distributed to all nodes such that the delay between the centralized laser pulse source and each node is controlled to within a small fraction of the channel width. This is difficult because the channel width is only a few pico-seconds. This time corresponds to a distance of much less than less than one millimeter for a pulse traveling at the speed of light. Given the physical size of the system, stress on the fibers, temperature variations and other environmental factors, it is required to actively control the delay from this central clock source to each node in the system.

To insure that the signal from the central clock source, i.e., the framing pulses, experience the same delays as the data, it ought to use the same optical path. However, this approach requires that this pulse must be separated from the data at the receiving node by some means. This leads to the problem of separating the data and the clock pulses by optical means, which is quite difficult and which may leave residual signals, which in turn reduce the signal-to-noise ratio of the entire system. Proposals that include orthogonal polarizations are prohibitively expensive. Proposals that try to distinguish between framing and data pulses by virtue of different amplitudes face dynamic range problems. Proposals that employ different wavelengths experience differences in the signal propagation speeds due to fiber dispersions in addition to facing all the problems of WDM systems and the needs for complex wavelength converters.

The power level of a central optical clock source shared by all nodes in the system must be designed to meet the requirements of the maximal system configuration size and represents a significant up-front investment cost, even when only a small number of nodes are present. The power levels available at each node in a system with one central optical clock source is relatively small and limits the choice of optical components used to isolate one channel from the combined OTDM traffic.

Previously described systems use polarization maintaining (PM) fibers, which are rather costly. In addition, the propagation speed of PM fibers differs slightly for the two polarizations, which requires compensations that is dependent on the distance between each node and the central clock source.

Therefore, there is a need for an optically coupled system that does not depend on a single centralized laser source at a hub.

SUMMARY OF THE INVENTION

Provided is a system for communicating optically encoded digital signals among a network of nodes in a plurality of time domain multiplexed channels. The nodes, for example, computer systems, are capable of generating and processing electronic digital signals. The nodes of the system are connected by means of optical transmit and receive fibers.

Each node comprises a laser, a transmitter, and a receiver connected to the transmitters of the other nodes by an optical delay element such as a fiber stretcher. The laser generates light pulses at a rate or "frequency" that can be controlled by an electronic frequency control signal supplied to an oscillator connected to the laser. Hereinafter, the term "frequency" refers to the rate at which the pulses are generated and not the wavelength of the light in the pulses.

Each transmitter is connected to a transmit fiber. A modulator of the transmitter determines whether pulses should pass through to the transmit fiber or whether pulses should be absorbed. The transmitter includes a delay unit for selecting specific time multiplexed channels into which the pulses should be inserted.

The fiber stretcher is connected to a receive fiber. The stretcher can be a Piezo-electric device for mechanically lengthening or shortening a short piece of optical fiber using an electronic phase control signal produced by the receiver. The phase control signal can vary the delay of the pulses by at least the width of one of the time multiplexed channels. The phase control signal can compensate for transmitter to receiver delays. The fiber stretcher has a range of slightly over one channel width. Hereinafter, "phase" refers to the relative position of the pulses to each other, and not the phase of the light in the pulses.

A delay unit of the receiver is connected to the fiber stretcher. The delay unit selects one of the time multiplexed channels to monitor. An optical AND gate has a first input connected to the receiver's delay unit and a second input connected to the laser. The output of the AND gate is connected to a photo-detector for converting detected light pulses back to an electronic form. The receiver includes electronic components that produce the frequency and phase control signals.

In addition, the system includes components and processes for acquiring global synchronizing from an initial random system state, and maintaining global synchronization for a stable operation of the system. Global synchronization means that all of the light pulses of all of the nodes in all of the time multiplexed channels are substantially identical in phase and frequency.

The system can include a hub having an input side connected to the transmit fibers of the nodes, and an output side connected to the receive fibers of the nodes. The hub can be configured as a passive power splitter for equally distributing the pulses from the transmit fibers to the receive fibers. In the simplest configuration, the transmitter of one node can be directly connected to the receiver of another node, and vice versa, without the use of a hub.

One of the time multiplexed channels is a reserved channel for carrying synchronization pulses. Each node sequentially contributes a single synchronization pulse on a periodic schedule such that for a system with N nodes, each node transmits a synchronization pulse on the reserved channel no more than once every N bit-periods.

As an advantage, the system uses distributed pulse generators local to each node. Because there is no single centralized pulse source, there is no single point of failure of an active component. Failure of one of the lasers that does not affect the operation of the rest of the system. In addition, the present system does not use framing pulses so there is no need to distinguish the framing pulses from data giving an improved signal to noise ratio at a lower cost. Furthermore, the local lasers only drive local components and hence can operate with less power enabling networks with a greater number of nodes.

DETAILED DESCRIPTION OF PREFERRED EMBODIMENTS

Introduction

Described is an optically coupled network of nodes. The nodes can be any means capable of transmitting and receiving electronic digital signals, for example, host computers, workstations, communication subsystems, Internet switches and routers, and the like. The system as disclosed herein does not require a centralized laser pulse source at a hub as in the prior art. Instead, the present system uses distributed laser pulse sources local to each node of the network. This has a number of advantages.

Because this configuration has no high-power centralized laser pulse source, the up-front cost is reduced, and there is no single point of failure. In addition, the locally generated pulses are free of any residual data signals, such as those passed through by an imperfect framing pulse-separating device as required in the prior art. Furthermore, the output power level of each local pulse source can be optimized to drive the local receivers and transmitters.

The challenge with having distributed laser pulse sources is to precisely synchronize all interconnected nodes in frequency and phase so that data sent by one node can be received correctly by all other nodes including itself. The methods and systems disclosed herein precisely synchronize all locally produced pulses by acquiring and maintaining global synchronization for all nodes in the network.

System Overview

Figure 5A:
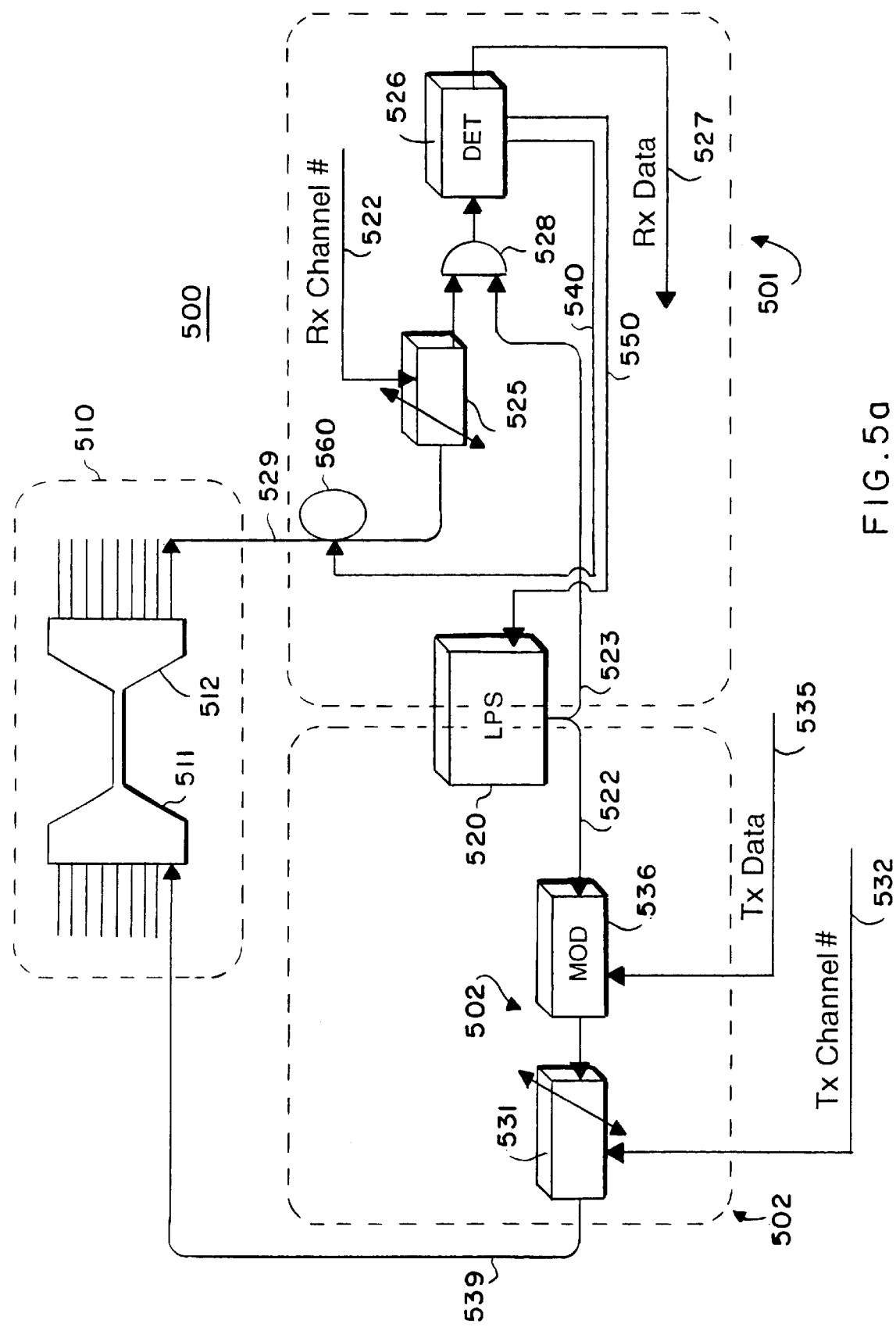
FIG. 5a is a block diagram of an optically coupled network of nodes using distributed synchronized laser sources connected through a hub.

FIG. 5a schematically shows an optical time domain multiplexed (OTDM) system 500 with synchronized, distributed laser pulse sources. Each node includes a receiver 501 and a transmitter 502. The output of the transmitter 502 is connected to an input side 511 of a hub 510 via "transmit" fiber 539, and the input of the receiver 501 is connected to an output side 512 of the hub 510 via a receive fiber 529. The receive fiber 529 receives data into the node, and the transmit fiber 539 transmits data from the node. The length of the fibers 529 and 539 is arbitrary, but does not change significantly during normal operation.

The optional hub 510 is configured as a passive power splitter that equally distributes light passing through it from an input side 511 to an output side 512. The hub 510 is sometimes also known as a star coupler.

Fiber Stretcher

A component labeled 560 forms the input side of the receiver 501. The receive fiber 529 carries the combined transmit signals of all nodes. The component 560 can be a Piezo-electric device that can mechanically lengthen or shorten a short piece of optical fiber using an electronic "phase control" signal on line 540. The stretcher 560 delays or advances the optical signal passing through it.

A very small change in the optical distance from the hub 510 to the input side of the receiver 501 allows the signal propagation delay between the hub 510 and the receiver 501 to be changed by slightly more than the width of one channel of a time domain multiplexed signal. For example, in a system with an aggregate bandwidth of 250 Giga-bits per second, the delay component 560 needs to be able to change its delay by approximately five pico-seconds. Because the Piezo-electric device 560 is mechanical, it can only change the delay at a very slow rate, e.g., about 10 KHz, ~0.1 milli-second from minimal to maximal delay. This ability to fine-tune the delay will be used to synchronize the phase of the system as described in greater detail below.

Local Pulse Source

A local laser pulse source (LPS) 520 generates a continuous series of very short pulses of light. The laser pulse source can be driven by a crystal oscillator. The repetition rate of the LPS 520 is equal to the bit rate of each channel within this system, and, therefore, needs to be fairly stable. In other words, the pulse jitter must be less that the channel width. The repetition rate can be changed electronically by a small amount by a "frequency control" signal on line 550. This ability to fine-tune the repetition rate will be used to synchronize the frequency of the system as described in greater detail below. The light pulses generated by the LPS 560 are respectively distributed to the receiver 501 and the transmitter 502 via fibers 523 and 522.

Receiver

The output side of the fiber stretcher 560 is connected to the input side of a first digital, variable delay unit 525 of the receiver 501. The delay unit 525 has a range of one bit-time, and has a resolution equivalent to the maximal number of supported channels, for example, 256 or more. The delay unit 525 is used to select the channel from which to receive data. The unit 525 is electronically controlled via a signal (RxChannel#) 522. The RxChannel# signal 525 is a binary representation of the receiver channel number. The delay unit 525 is capable of switching channels rapidly by inserting or removing optical delay elements using conventional electro-optical switches. These delay elements can be pieces of fiber or optical waveguides with precisely controlled length.

The output of the first delay unit 525 is connected to an optical AND gate 528. The AND gate 528 is an optically controlled device that allows light to pass through for only for a brief moment when it is triggered by a short pulse from the LPS 520 via fiber 523. The AND gate 528 isolates the data from the particular channel selected by the first delay unit 525.

It is important to note that the AND gate 528 does not open instantaneously. Instead the fraction of light that can pass through the gate 528 in response to the trigger pulse on fiber 523 follows a bell-shaped curve that is centered in time on the intended data channel and whose width is approximately equal to the temporal separation between two adjacent data channels. Therefore, any difference between the expected arrival of data and the actual arrival of data results in a reduction of the amount of light that will pass through the gate. This effect, and its use are described in greater detail below with reference to FIG. 7.

The output of the first gate 528 is connected to an optical detector (DET) 526. The detector 626 converts a light pulse to an electronic signal on line 527 using, for example, a semiconductor photo-diode. The signal on line 527 (logical ones and zeroes) are the received data (RxData) for a particular channel selected by the delay unit 525.

The receiver 501 is also configured to generate the phase and frequency control signals on lines 540 and 550 which are derived from the amplitudes of received "one" pulse. The control signals are produced in the electronic domain, and processes for generating the control signals are described in detail below. It is understood that these processes can be implemented in hardware, software, firmware, or combinations thereof.

Transmitter

A portion of the light produced by the LPS 520 is sent to a modulator 536 of the transmitter 502 via fiber 522. A transmit data signal (TxData) on line 535 determines whether the light pulses pass through the modulator 536 or are absorbed.

The output of the modulator 536 is connected to a second variable delay unit 531. This unit is controlled by a signal (TxChannel#) 532 on line 532. The TxChannel# signal determines which channel is used to transmit data. The second delay unit 531 operates like the first delay unit 525. The output of the second delay unit is connected to the input side 511 of the hub 510 via the transmit fiber 539.

Alternative Arrangement

Figure 5B:
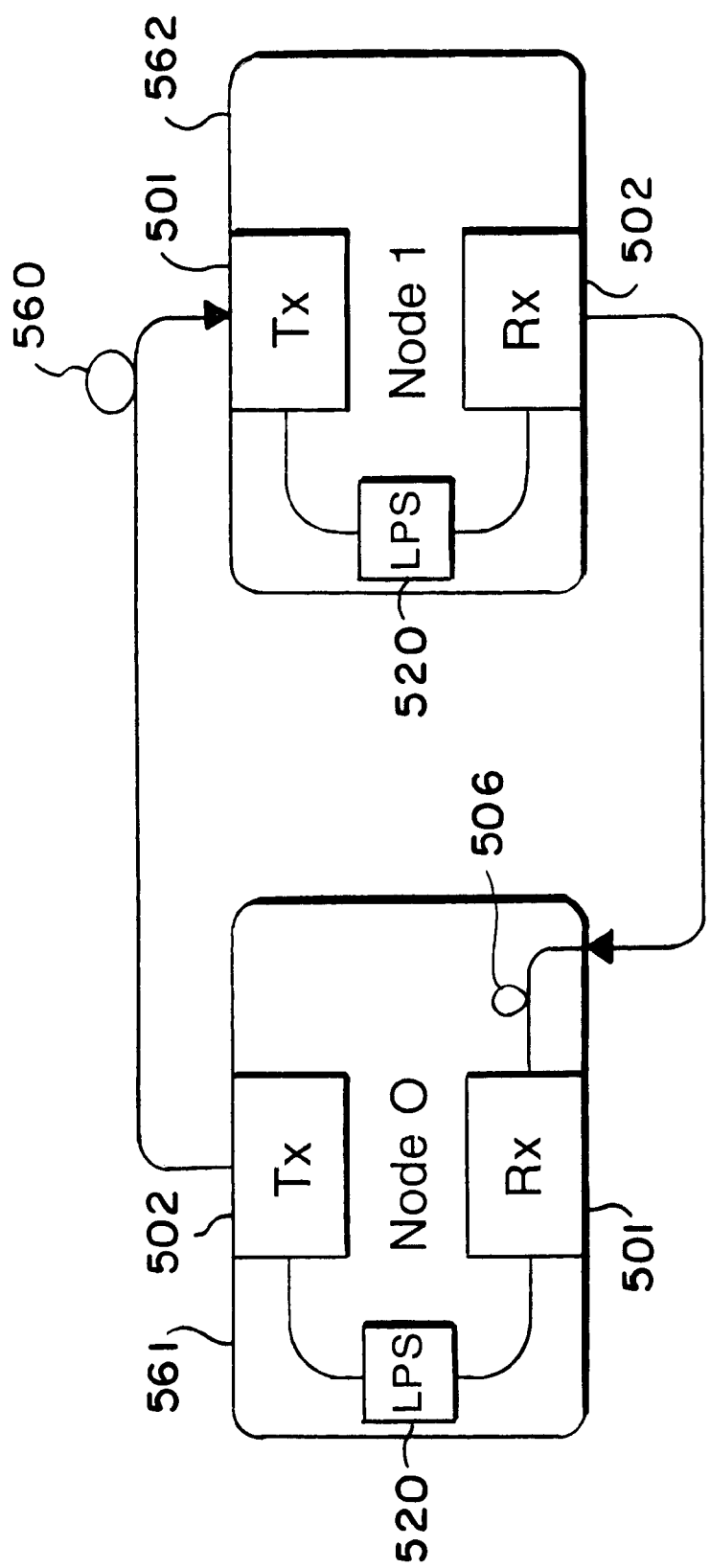
FIG. 5b is a block diagram of a network of nodes without a hub.

FIG. 5b shows the simplest form of a network of nodes with distributed local pulse sources 520. Because the present system does not require a centralized laser, it can be configured without a hub. Two nodes 561 and 561 (Node 0 and Node 1) have their transmitters directly connected to the other's receivers. In other words, the transmit fiber of one node is the receive fiber of the other, and vice versa.

Conditions Necessary for Synchronization

In order for the system, either as shown in FIG. 5a or FIG. 5b, to be properly synchronized, the following three conditions must be satisfied. First, all of the local light pulse source 520 must run at exactly the same frequency (bit rate). Second, the delays from node to node are exactly known. Third, the phase of each LPS 520 is controlled such that pulses from all of the nodes line up on one common channel raster at their receivers' inputs.

The first condition is a prerequisite for conditions two and three. Without a common bit-rate, it is not sensible to define delays and phase-relations between nodes. The first condition requires synchronization in the strictest sense: only if all of the pulse sources run at exactly the same frequency will their relative phases remain constant. If the second condition is satisfied, then all nodes can agree upon a common way of assigning channel numbers to the delay units of their transmitters and receivers.

Time Domain Multiplexed Signals

Figure 1:
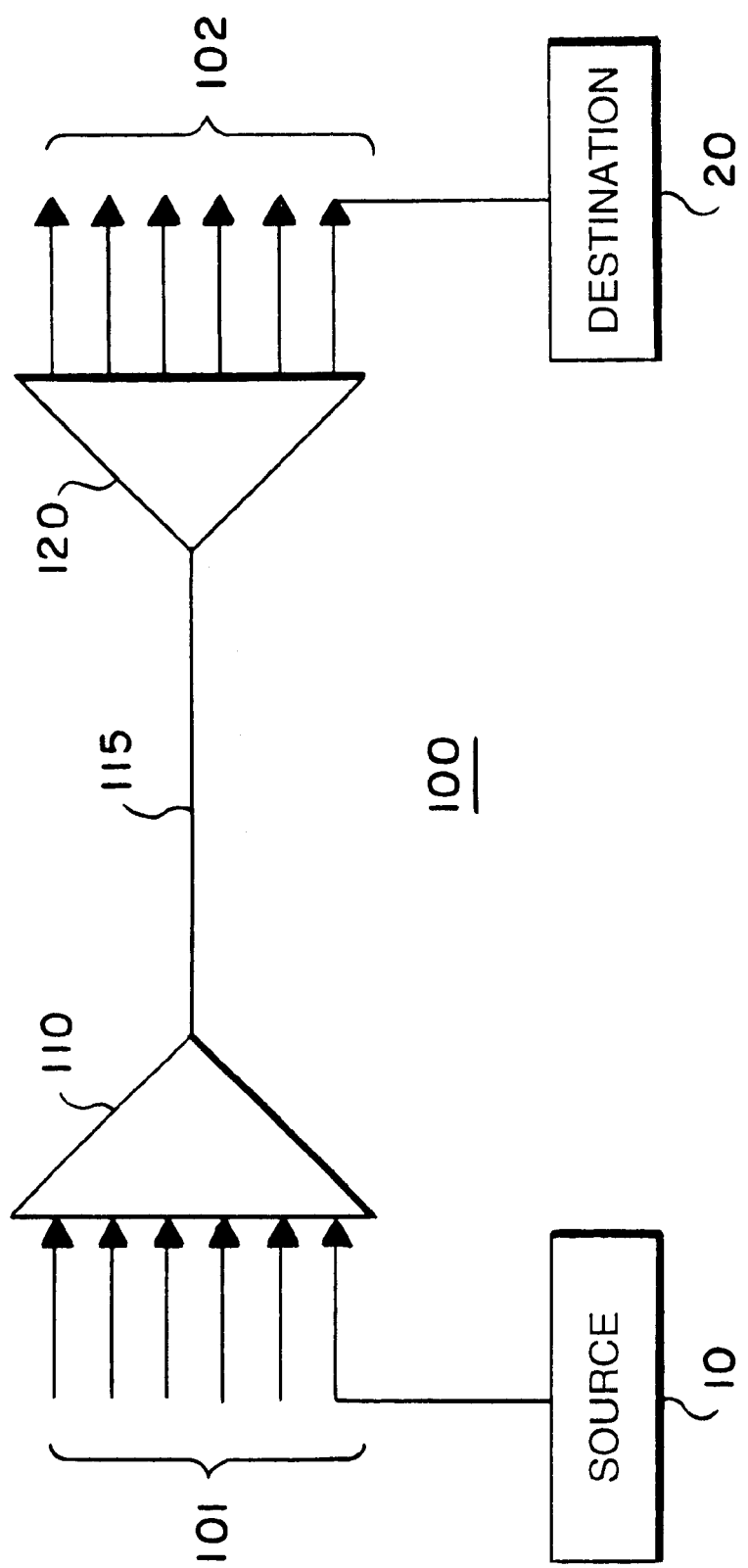
FIG. 1 is a schematic of an optically coupled network.
Figure 2:
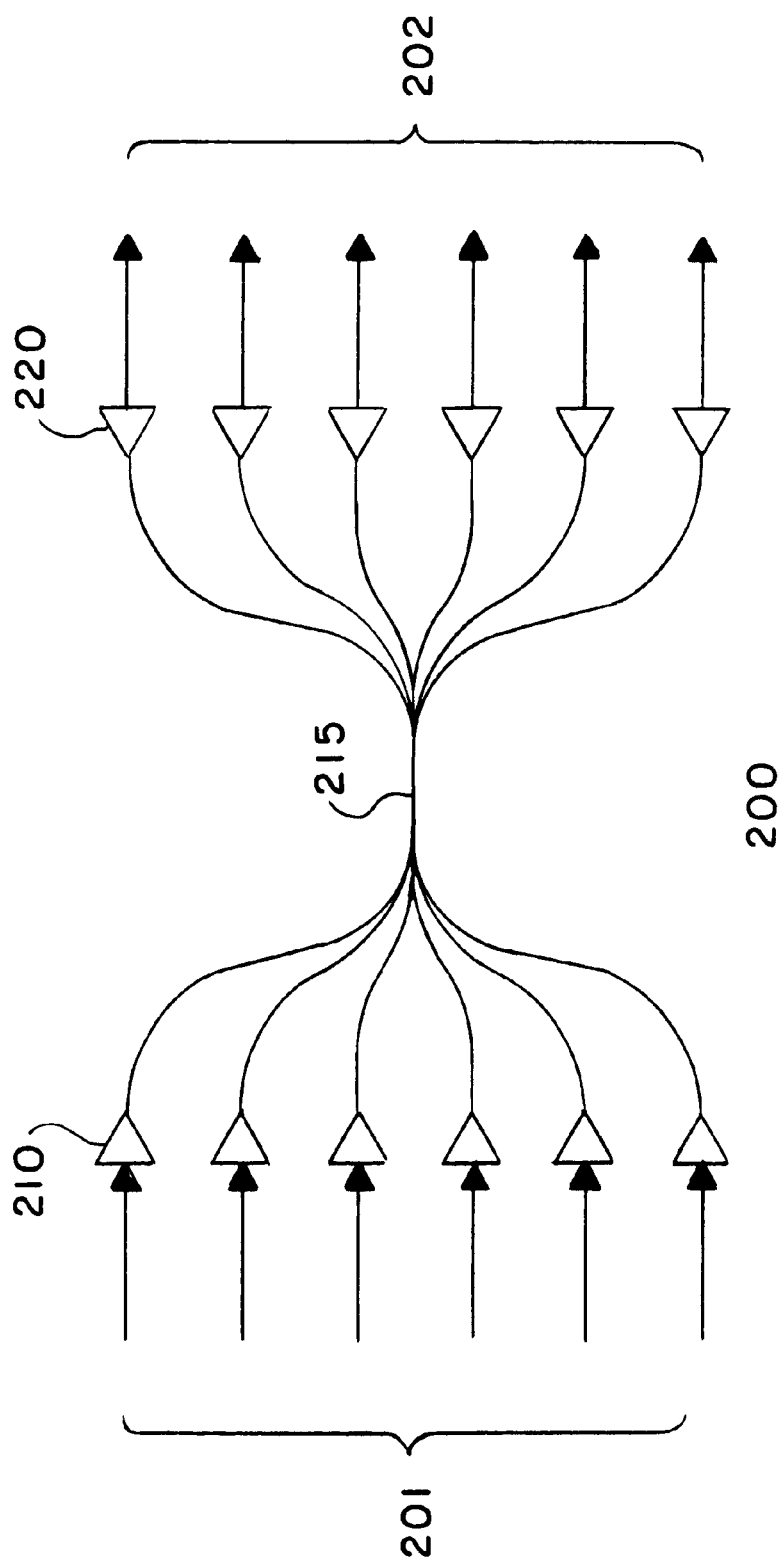
FIG. 2 is a schematic of an optically coupled broadcast network.
Figure 3:
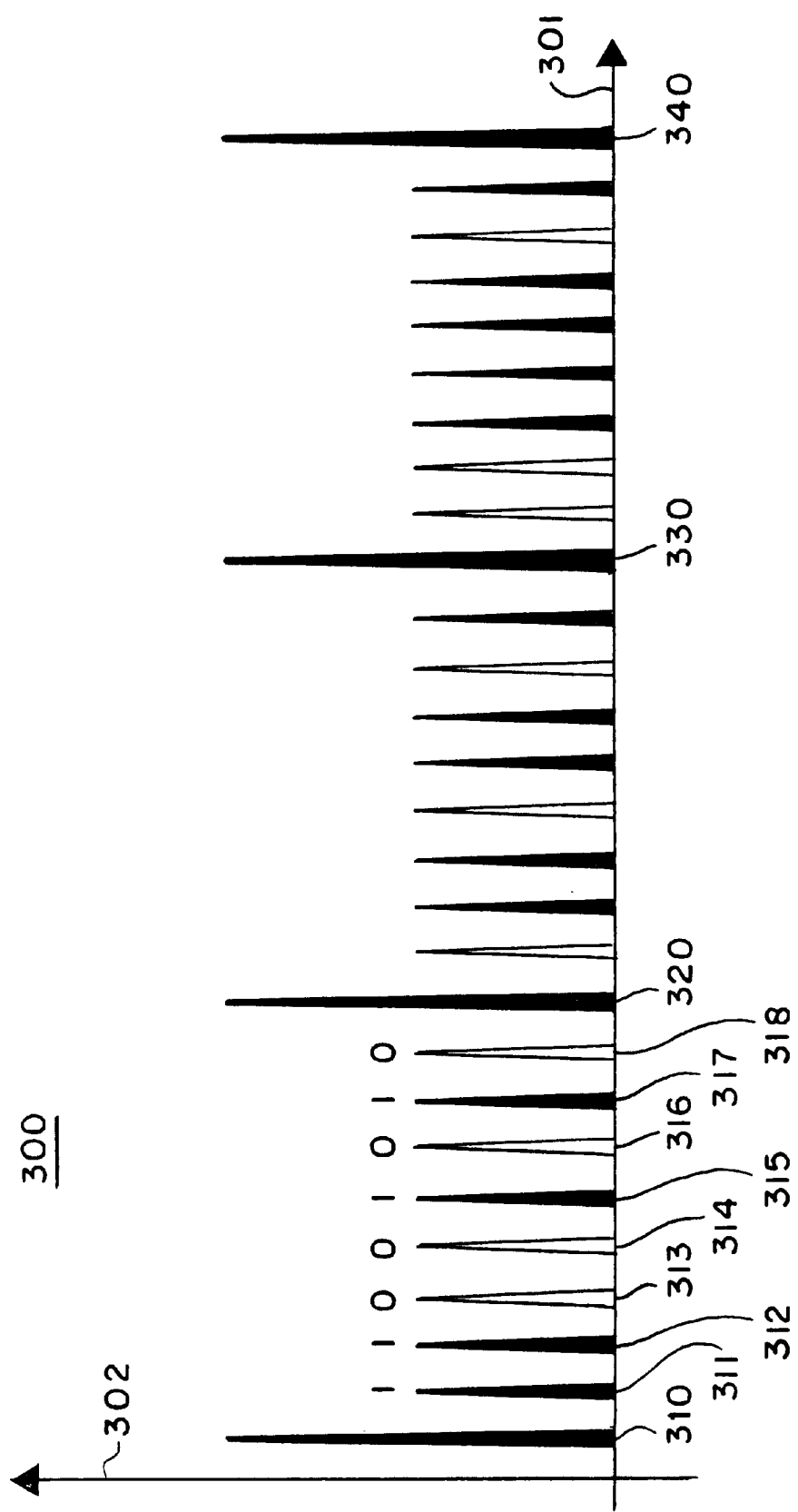
FIG. 3 is a timing diagram of a prior art optical time domain multiplexed signal including framing pulses produced by a centralized laser.
Figure 6:
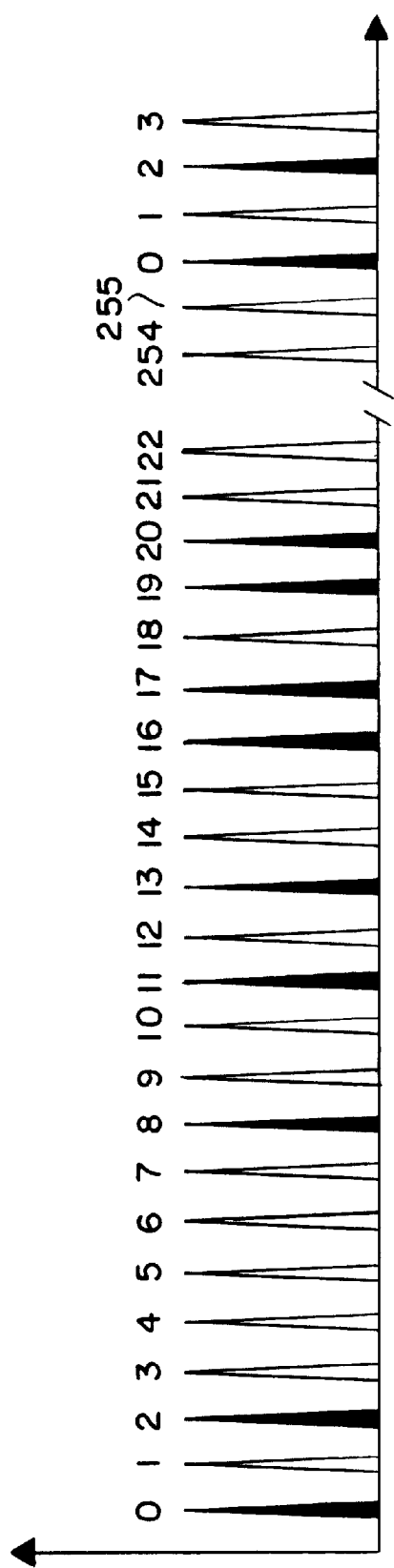
FIG. 6 is a timing diagram of an optical time domain multiplexed signal as produced by the systems of FIGS. 5a and 5b.

FIG. 6 shows how the combined signal appears at the hub when all conditions are met. As before, the x-axis indicates time, and the y-axis pulse intensity. The numbers (0–255) above the pulses are the various channels. Solid pulses are logical ones, and open pulses are logical zeros. Here, all pulses are the same height (intensity), and notice the absence of framing pulses, compare with FIG. 3.

For the system to operate correctly, the pulses on the various channels must be exactly synchronized in time. If a particular node wants to transmit its data on the first channel (channel "0"), then the node needs to adjust the delay unit 531 in its transmitter 502 such that the pulses from its LPS line up on this channel anywhere in the network. In other words, a correct delay also compensate for any delay in the modulator 536 and the fiber 539.

Likewise, if a node wants to receive data from a particular channel, then the node must adjust the receiver delay unit 525 such that pulses from the selected channel line up exactly with the pulses from its local pulse source 520 at the input of the AND 525. This delay must also account for the delay introduced by the receive fiber 529 from the hub to the node. Since channels repeat at the bit rate, the actual delay that must be realized by the receiver's delay unit 525 need not exceed one bit period. If the delay is larger than one bit period, then the delays that are an integral multiple of the bit period are simply handled in the digital domain by transmitting or receiving the data one cycle sooner or later. Only the fractional delay, which is a multiple of the channel separation time must be realized by the receiver's delay unit.

In order to minimize the loss of signal intensity due to temporal channel mis-alignment, the precision of the delay units ought to be a small fraction of the channel separation time, for example, less than 10%. The actual inherent delays of each node can be measure during an initialization phase of the arrangement when synchronization is acquired as described below. The delays can be stored in a table of a memory as a channel map electronically accessible by the nodes. The data in the table can later be used during operation to make dynamic adjustments to compensate for errors due to manufacturing, differences in the components, or aging. Temporal misalignment can be compensated by either using the fiber stretcher 560, or by using delay units with a higher resolution.

Because the total round-trip delay from node to node is normally not an integral multiple of the channel spacing time, the Piezo-electric device 560 is used to add a small delay to round-up the total round-trip delay to be an integral multiple of the channel separation time. This is one of two functions that are provided by the Piezo-electric device 560.

The third required synchronization condition means that the phase between any two local pulse sources cannot be arbitrary, rather, the phase is dictated by the optical delay from the node to the hub, and the hub to the node. Phases can be expressed in terms of the total bit rate (TBR). The TBR is the bit rate of the individual channels multiplied by the number of channels. The TBR is the inverse of the channel separation time; the time that defines the regular spacing in time at which data bits must appear anywhere on the fibers, and the hub when one is included.

Given that the transmitter's delay unit 531 delays pulses only by an integral multiple of the channel separation time, the TBR-phase of the LPS 520 is not altered, no matter which particular transmit channel is in use. Hence, the only factor that impacts the TBR-phase is the optical delay of the fibers. Since the length of the fibers does not change significantly during operation, this delay is constant. Hence, the LPS phase is initialized such that the TBR-phase of all nodes is zero. This means that data pulses line up perfectly in time as shown in FIG. 6.

However, practical oscillators, such the one used to drive the local pulse source 520, are far from stable, rather they tend to drift over time due to changes in temperature, age, and other operating conditions. Likewise, the optical delay of the fibers used to carry the pulses is not totally constant, rather it changes with temperature, electromagnetic fields, mechanical stress, age, humidity, etc. Both of these factors will cause a real system to loose synchronization fairly quickly unless the system includes means to correct for these factors.

Described herein are processes for enforcing synchronization of the pulses by continuously adjusting the frequency (bit rate) of the local pulse sources 520 via line 550, and the node-to-node delays via signals to the fiber stretcher 560 on line 540. The processes includes the following two methods. Acquiring global synchronization from a random state during an initialization phase, and maintaining global synchronization during a stable operational phase. The later method includes continuously measuring deviations from the synchronized state at a level before the deviations impact correct system operations, and continuously determining corrections for the measured deviations such that the overall operation of the system is stable, and remains synchronized barring component failures. Because maintaining the stable state of global synchronization is less complicated, this process is described first before the more complex process of acquiring global synchronization from a random state is described.

Maintaining a Stable System State by Global Synchronization

To monitor the phases between nodes, one channel is reserved for synchronization. The reserved channel cannot be used to carry data. This results in a fractional loss in useable bandwidth, for example, $\frac{1}{256}$ when 256 channels are used. The reserved channel only transmits logical ones; these are called synchronization pulses. In other words, every 256th time slot is guaranteed to include only a synchronization pulse. Any channel can be used for this purpose, for example, the reserved channel can be channel "0."

However, here the synchronization pulses are not supplied by a single pulse source as in the prior art. Instead, all nodes sequentially contribute a synchronization pulse on a periodic schedule, for example, the first node sends the first channel "0" synchronization pulse, then the second node transmits the following channel "0" pulse, and so forth, until it is the first node's turn again. This means that if there are N nodes in the system, then each node transmits a synchronization pulse on the reserved channel once every N bit-periods.

Signal Dithering

To detect changes in the phase of received signals, the fiber stretcher 560 periodically changes the delay in signal to the receiver 501 by a small amount, i.e., the stretcher 560 "dithers" the signal in time. This dithering causes changes in the intensity of the amount of light measured by the detector 526 at a particular point in time while the detector is receiving the synchronization pulses on the reserved channel.

Figure 7C:
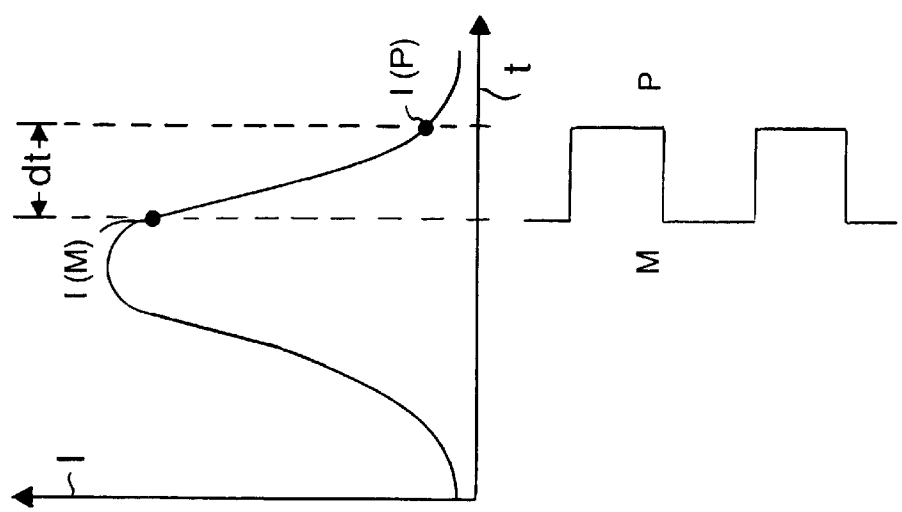
FIGS. 7a–7c are graphs of a dithered optical signal.
Figure 7B:
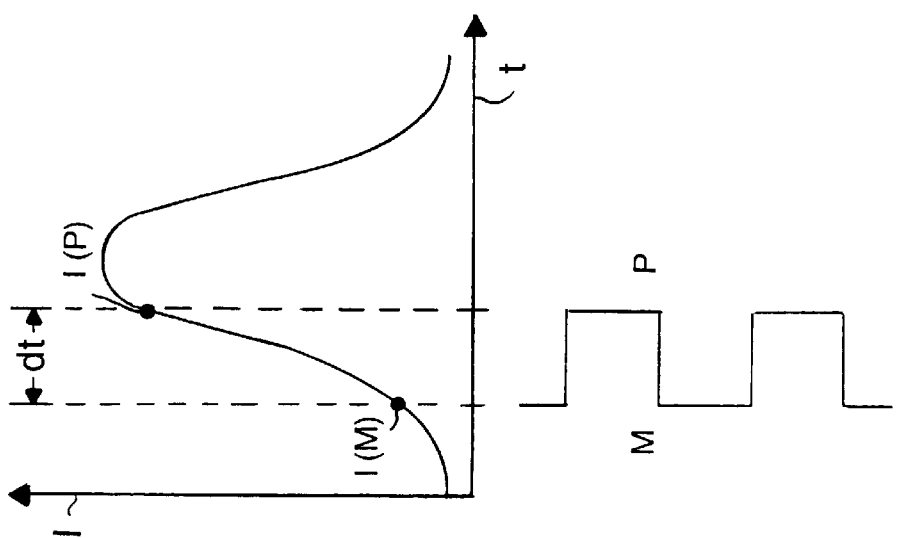
Figure 7A:
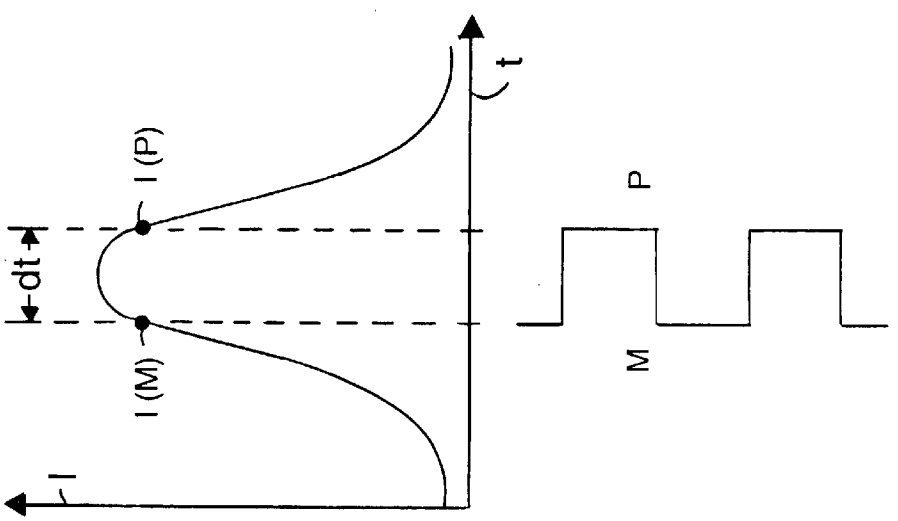

A simplified representation of the dithering process is shown in FIGS. 7a to 7c. In FIGS. 7a–7c, as before, the x-axis indicates time (t), and the y-axis indicates signal intensity (I). The intensity of the synchronization pulse varies as a function of channel alignment, i.e. time t, (in other words the received TBR phase). The signal at the detector 526, as stated above, is a bell shaped curve 700. The delay induced by the Piezo-electric fiber stretcher 560 is changed periodically between the positions labeled "M" and "P" by the dithering signal on line 540. The positions "M" and "P" are separated by a small amount of time labeled "dt."

If a synchronization pulse on the reserved channel is perfectly aligned, as shown in FIG. 7*a*, then the received intensities measured at positions "M" and "P," are identical with both applied delays (stretcher and delay unit), i.e., I(M)=I(P). This is true because the synchronization pulse will be centered on the symmetric aperture function, and the dithering is correctly switching the synchronization pulses back and forth between two points in time on both sides of the bell curve 700 that represent equal intensity.

If a synchronization pulse arrives too early, then the measured intensity at point "M" will be considerably less than what is measured at point "P," i.e., I(M)<I(P) as shown in FIG. 7*b*. Likewise, if a synchronization pulse arrives too late, then I(M)>I(P). Thus, the measured difference in pulse intensities at positions "M" and "P" while the received synchronizing pulses are dithered is a measure of the sign and magnitude of the TBR phase of the received synchronization pulses. The sign and magnitude of the TBR phase can be used to produce a phase correction signal that can be added to the phase control signal on line 540 to stabilize the synchronization pulses in phase.

In practice, the dithering will be a sinusoidal modulation between the positions "M" and "P," instead of two distinct points. The amplitude of the phase control signal on line 540, including the correction signal, for the stretcher 560 is small enough so that it does not reduce the signal-to-noise ration of any of the pulses passing through the stretcher 560. Intensity comparison of the signal at points "M" and "P" can be accomplished through coherent detection and a comparator.

The method as described above can be used to measure the TBR phase of any synchronization pulse. Hence, by properly gating the coherent detection process, given the fact that the nodes sequentially contribute a synchronization pulse, the TBR phase of one or more specific nodes can be measured, including the TBR phase of pulses transmitted by the same node doing the measuring. The process for maintaining synchronization, as described below, requires that each node measures the synchronization pulse TBR phase of its own transmissions, and the transmissions of at least one other node.

To maintain global synchronization, each node must derive correction signals from the phase measurements described above. The two components that are the means to maintain synchronization are the Piezo-electric device 560 and the local pulse source 530. The stretcher 560 is used to stabilize the round-trip delay, which in turn enables reliable phase measurements between nodes that are used to keep the pulse phases stable.

The local TBR phase is used to keep the round-trip delay for the local node to be an integral multiple of the channel separation time. This means that any deviation of the local TBR phase from 0 is used to either increase or decrease the stretcher's delay. This can be accomplished by a simple control loop that adjusts the DC component to the Piezo-electric fiber stretcher 560, while the AC component used for the sinusoidal dither function remains constant.

In the event that the delay needed to maintain "0" phase exceed one channel separation time, (the approximate range of the Piezo-electric fiber stretcher 560, a one is either added or subtracted from the offset to the receiver's delay unit 525, while the Piezo-electric fiber stretcher 560 control signal is reset to the other end of its range. To avoid frequent reset operation, the Piezo-electric fiber stretcher range should slightly exceed one channel separation time to provide for some hysteresis.

In order to control all local pulse sources 520 in the system 500 such that the TBR phase of all pulses of all nodes is zero, a distributed phase-locked loop is used. This process uses a total bit rate (TBR) phase monitoring that can be built during the initialization phase, and dynamically updated during the operational phases as nodes as added or removed.

Phase Monitoring Graph

For a system with a set of n nodes $\{N_l, \ldots, N_i, \ldots, N_j, \ldots, N_n\}$, the synchronization pulse TBR phase monitoring graph is constructed where each vertex in the graph represents one of the system nodes, and directed edges represent monitoring relationships between the nodes. One directional edge is added between a vertex I and a vertex j, if and only if node I monitors the TBR phase of the synchronization pulses of node j.

During the operational phase, the graph is strongly connected and symmetric, i.e., every vertex has at least one directed edges in an opposite directions. This is the reason for monitoring at least two nodes because otherwise no strongly connected graph with more than two vertices exists. To improve stability, the diameter of this graph should be minimized. Since the graph is static for a particular configuration, and changes only when nodes are added to, or removed from the system, it can be predetermined and stored as table in the memory accessible by the nodes. During the initialization phase, the graph can be asymmetric for reasons stated below.

To close the distributed phase-locked loop, each node averages and low-pass filters the synchronization TBR-phases of all remote nodes that are monitored to produce phase correction signals. The phase correction signals are integrated and applied to the stretcher 560. The details of a distributed phase-locked loop that can be used, and its convergence proof are described by Nowatzyk, in "A Communication Architecture for Multi-processor Networks," Ph.D. Thesis, School of Computer Science, Carnegie Mellon University, 1989.

Figure 8:
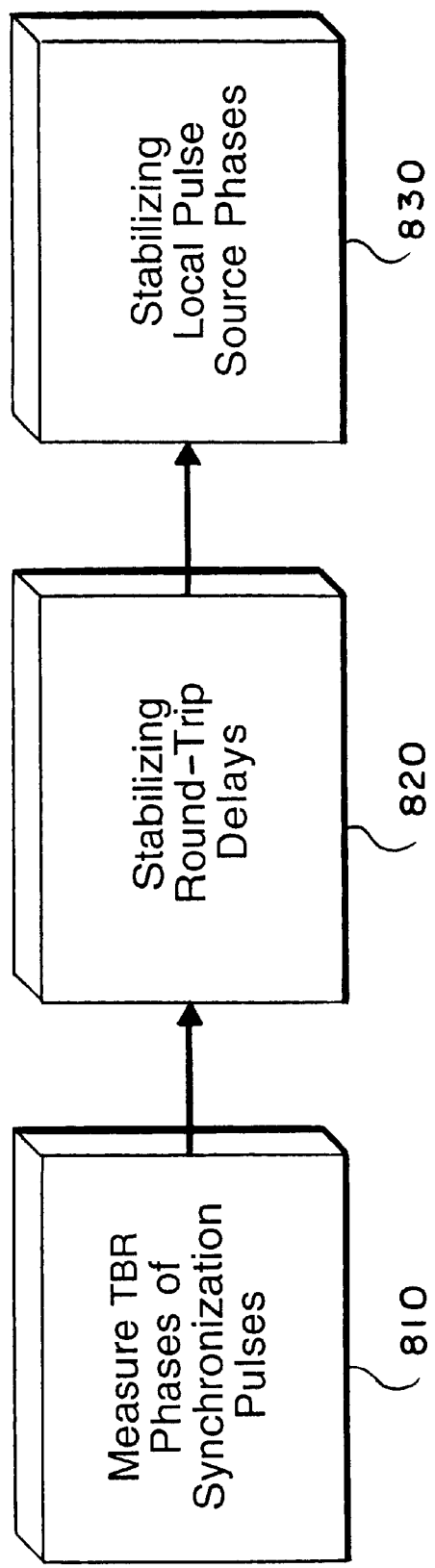
FIG. 8 is a flow diagram of a process for maintaining global synchronization.

As shown in FIG. 8, the described method for maintaining global synchronization comprises: measuring the TBR phases of synchronization pulses within a collection of coupled nodes (810); stabilizing the round-trip delays using the measured TBR phases (820); and stabilizing mutual local pulse source phases by means of a distributed phase locked loop (830).

The synchronization maintenance can causes a fairly high rate of channel switching for the transceiver module. The transmitter needs to be tuned to the reserved channel every N bit times, and the receiver needs to monitor the reserved channel for at least three out of every N bit cycles, where N is the total number of channels in the system (for example 256). This results in millions of TBR-phase measurements per second. For example, a 256-channel system operating at 1 Giga-bit/sec would produce about 4 million TBR phase samples per second.

However, the Piezo-electric fiber stretcher 560 only has a bandwidth in the low KHz range. Likewise, the factors that cause drift, such as temperature and aging, also operate at a much slower time scale. Therefore, in practice, TBR phase sampling can proceed at a much low rate. This means that synchronization pulses can be sent at a lower, but predictable rate. This in turn will produce periods in time when no synchronization pulse are present on the reserved channel. Violations of this schedule can be detected and used to sense problems, or to notice when nodes are added or removed while the system is operating.

Acquiring Global Synchronization from a Random System State

When the system is initially activated, the frequencies and phases of all of the local pulse sources will be random, and the round-trip delays from node to node are unknown. An initialization procedure is necessary to establish synchronization because the synchronization maintenance processes described above are not able to achieve synchronization from an arbitrary random system state.

Figure 9:
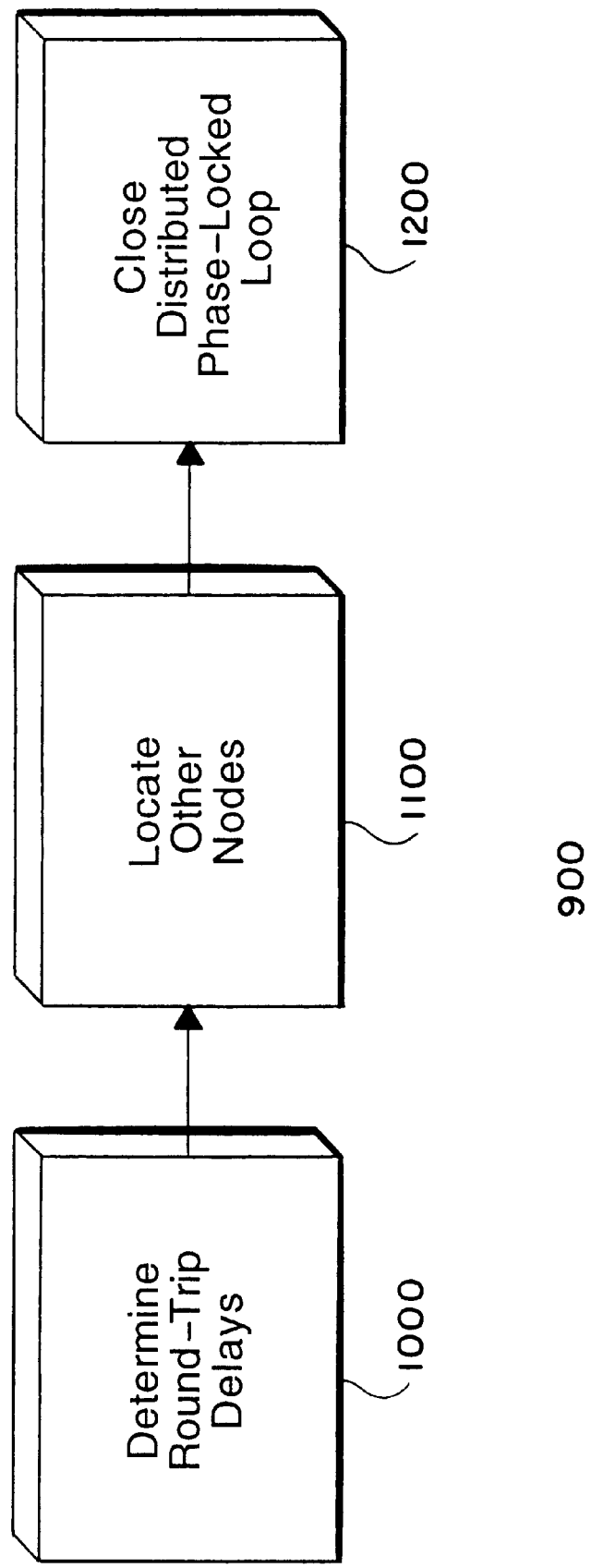
FIG. 9 is a flow diagram for a process for acquiring global synchronization.

As shown in FIG. 9, the initialization process described below comprises the following steps: determining the round-trip node delay 1000; locating other nodes in the system 1100; and closing the distributed phase locked loop 1200.

Determining Round-Trip Delays

Figure 10:
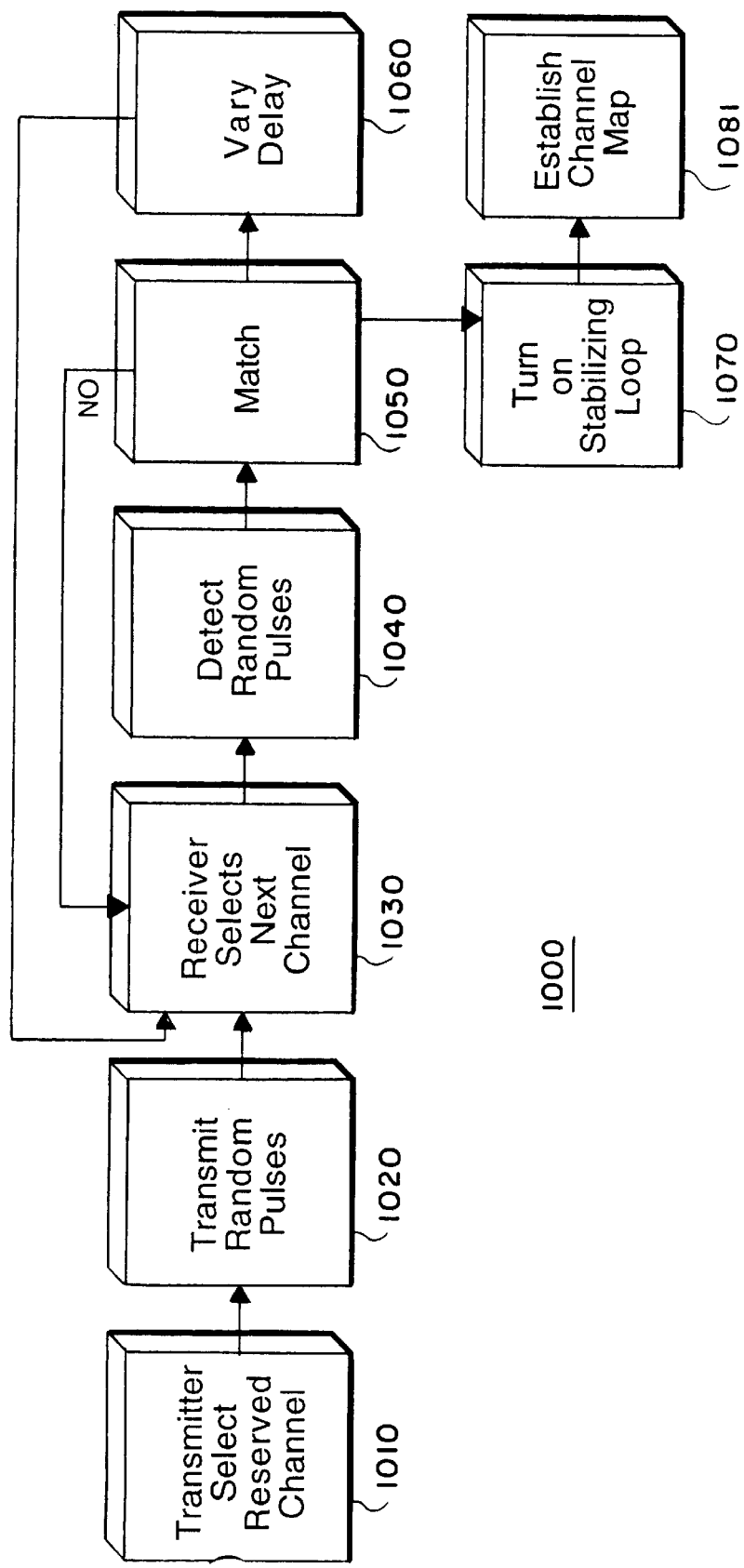
FIG. 10 is a flow diagram of a method for determining round trip delays.

FIG. 10 shows the sub-steps 1000 for determining the round-trip delays. For the first step 1010, a particular node sets its transmitter's delay unit 531 to the reserved channel, e.g., channel "0." Then, the transmitter 502 begins sending random pulses with a very low duty cycle in step 1020. For example, on average one pulse is sent out every 500 bit times. It is important that all nodes use different random sequences. The random pulses can be derived from a unique node-identification (ID), or from a hardware random number generator.

Next, in step 1030, the local receiver sequentially selects the channels to detect the random pulses in step 1040 to determine is there is a match in step 1050. A sufficiently large number of pulse transmissions are used in this correlation process to rule out an accidental match caused by transmissions from other nodes that are executing the same procedure.

The time required for this matching process is shortened by that fact that mismatches are fairly quickly detected. For example, if a "1" is sent, but a "0" was received, the receiver knows that it is tuned to the wrong channel and the next channel should be selected in step 1030. However, receiving a "1" when a "0" was sent out can also be due to interference from another node and does not necessarily indicate a mismatch. This is why a low duty-cycle on the random pulses during the detection period aids the synchronization acquisition process because interference is minimized.

The correlation process, which is executed in the electronic domain, must consider multi-bit delays because the round-trip length of the fiber loop from the transmitter to the receiver is unknown. Only one receiver delay combination (stretcher 560 and delay unit 525) can result in a match. The confidence in the match 1050 can be made arbitrarily high by requiring a large number of bit matches in step 1050. For all practical purposes, matching about a thousand bits is sufficient to result in an acquisition time requirement of few milli-seconds.

After all channels have been tried, the setting of the fiber stretcher 560 is changed in step 1060 to vary the round-trip delay, and steps 1030, 1040, and 1050 are repeated for all channels. A number of different settings of the Piezo-electric fiber stretcher are attempted because the round-trip delay is not necessarily an integral multiple of the channel separation time. The number of setting that need to be made in step 1060 for all of the channels is fairly small, typically in the range of four to eight because the temporal aperture, (width in time) of the AND gate 528 is a large fraction of the channel separation time.

The time required to determine the round-trip delay is largely dominated by the slow response of the Piezo-electric fiber stretcher 560. In order to minimize the acquisition time, it is therefore preferred that all channels are tried before changing to the next setting of the Piezo-electric fiber stretcher, although these sub-steps could be inverted.

After a match is found in step 1050, the round-trip stabilization loop 820 of the synchronization maintenance process can be turned on in step 1070. For this purpose, the transmitter begins transmitting regularly spaced synchronization pulses on the reserved channel, and the local receiver tracks the TBR phase of these pulses to control the local Piezo-electric fiber stretcher.

At this point, the local node's channel map for the receiver's delay unit is established in step 1080, and the round-trip delay is known. This completes the first step of the initialization procedure.

Locating Other Nodes

The second step 1100 of the initialization procedure 900 locates the other nodes. This step is based on the fact that the free running, i.e., uncontrolled, local pulse source frequencies of all of the local pulse sources 520 are probably very close to the design specified nominal frequency.

In practice, the local pulse source is driven by a tunable voltage controlled oscillator (XVCO), for example, a quartz crystal. Such devices typically have a tolerance of 1 in 10 million or better. This means that even without the distributed phase locked-loop engaged, the operating frequencies of two nodes will not differ by much.

However, nodes with free running pulse sources will never exactly operate at the same frequency. This causes the synchronization pulses that are sent by one node on the reserved channel to slowly drift through all channels as perceived by another node. It is exactly this drift that used to locate other nodes in step 1100 and lock onto other nodes in step 1200. When a node is in "drift" mode, that means its local pulse source is free running without a frequency control signal on line 550, even though the round-trip stabilization process 820 is engaged by the phase control signal on line 540 as described above.

Figure 11:
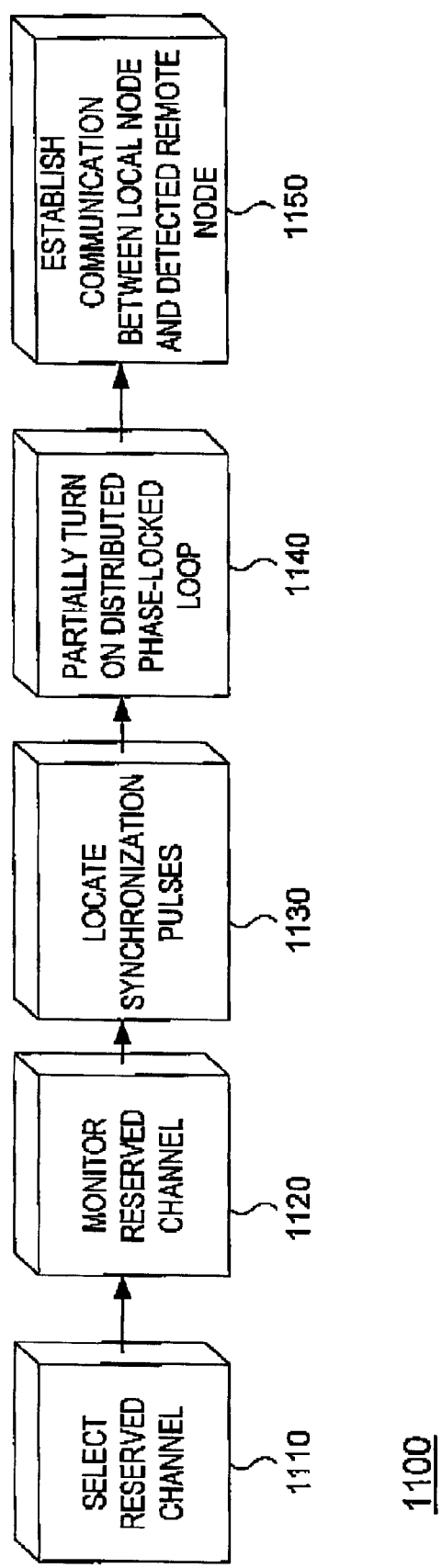
FIG. 11 is a flow diagram of a method for locating other nodes.

FIG. 11 shows the sub-steps 1100 of locating other nodes. In step 1110, the receiver of the free running node selects the reserved channel, and in step 1120 the receiver monitors the reserved channel for locally generated synchronization pulses. In step 1130, the receiver attempts to locate synchronization pulses from other nodes. If the nodes are drifting, these pulses will appear sporadically, depending on the actual drift rate.

During the initialization process, the local node randomly changes its drift rate by applying different control voltages to its local pulse source 520 on line 550.

When the synchronization pulses from another node are detected on the reserved channel, the local node partially turns on its distributed phaselocked loop in step 1140 so that the local pulse source 520 is controlled to keep the remote synchronization pulse centered on a 0 TBR phase. In essence, the local node will match its pulse frequency to that of the remote node. This will stop the drift and allows the local node to communicate with the other detected node.

As stated earlier, the synchronization pulses have a low duty cycle. This allows the synchronization pulses to be composed of two components:

a) equidistantly spaced pulses that serve to measure the TBR phase; and b) an identifier and communication sub-channel.

Equidistantly spaced pulses (a) minimize the measured noise on the TBR phase detection, and enable the location of remote synchronization pulses during the drift phase. The communication sub-channel is simply one extra location in time where a node can place a synchronization pulse. These sub-channel pulse locations can be spaced fairly far apart to minimize channel switching overhead during normal operation because there is not much need for this extra communication channel.

During the drift phase of the initialization procedure, nodes send their node identification number, for example, a short binary number that uniquely identifies each node within a system, at regular intervals on the communication sub-channel, and monitor this channel for signals from other nodes. When a node has locked onto the synchronization pulses from another node during the drift phase, the node monitors the synchronization sub-channel of the remote node and records its node ID.

Subsequently, the node tries to inform the remote node that its signal has been received and provides the ID of the local node by transmitting on the synchronization sub-channel of the remote node. This can be done using a retry procedure with collision detection and exponential back-off to deal with the fact that several nodes may have locked onto the synchronization pulses of the same remote node. This technique can be similar to the one used on an Ethernet to resolve access conflicts in a distributed fashion.

After communication has been established between two nodes via the synchronization sub-channel, these two nodes have exchanged each others IDs. While the drift-mode location does not guarantee that the two nodes are locked in the correct phase with respect to their synchronization pulse schedule, the two nodes can resolve this by requiring the node with, for example, the lower ID to adjust its synchronization pulse phase to be consistent with that of the node with the higher ID.

The procedure described in the previous paragraph show how two individual nodes can lock onto each other and enable their distributed phase locked loops to remain locked and synchronized. However the same procedure allows any other single node to join the group, by locking onto the synchronization pulses of one of the nodes that is part of a synchronized group.

Because synchronization sub-channel communication is maintained between group members, a deterministic protocol for adjusting the TBRphase monitoring relation exists: the node with the highest node-ID looks up the appropriate graph for the given number of nodes in a group. It then tell each member of the group which other member of the group should be used for its TBR-phase tracking loop.

However, this procedure does not prevent the formation of multiple, synchronized groups that are not synchronized with respect to each other. Hence after joining a group, nodes continue to look for synchronization pulses from nodes that are not part of the group. Only one member of a group should engage in this location process because once a synchronization signal is located, locking onto it requites control of the local pulse source.

However, because the local pulse source is already controlled to maintain lock within the group, simultaneously locking onto two different sets of synchronization pulses is not possible. Therefore the TBR phase monitoring graph used by a group during the initialization phase is asymmetric so that a designated "lead" node only exports the phase of its local pulse source, but remains free running and does not monitor the TBR-phase of any other nodes. The lead node's distributed phase lockedloop is not engaged, and this node is free to look for other nodes or groups. The lead node can be selected based on the unique node-ID's. There are numerous other ways to elect a leader in a group of communicating nodes.

After two groups detect each other, they mutually select a single lead node that reorganizes the group by distributing a new TBR phase monitoring graph for the entire group.

After all nodes within the system have been located and merged into one synchronized group, the TBR phase monitoring graph described above may be switch to a symmetric version that is more robust towards noise and node failures. After that is done, nodes can be added to the operational system one at the time.

There are several variants of possible initialization procedures that are all based on the same principle. For example, only a designated super-node is allowed to form groups, by adding individual nodes to its group one by one. This avoids the problem of merging groups.

If the presence of two groups is detected, then the group that contains the lowest node-ID dissolves so that the other group absorbs the individual nodes. It is possible to use a symmetric TBR phase measuring graph within a group and use several free TBR-phase detection channels to cause two groups to adjust their collective local pulse sources in a distributed fashion.

In summary, the process to acquire synchronization includes the following steps. The first step is a method that exhaustively searches all possible receiver delays to determine round-trip delays using random codes and correlation. The second step uses deliberate drifting, via free running pulse sources controlled with random control voltages, to locate other nodes. In the third step, nodes lock onto each others synchronization pulses to form groups until all nodes are locked onto synchronization pulses of a single frequency.

While the second step is probabilistic in nature, it rapidly converges because the detection probability increases with the size of the group. In addition, because the process executes concurrently on all nodes, it yields an exponential decrease in the population of unsynchronized nodes.

Alternative Embodiments

The example networked systems described above focuses on starcoupled topologies with one passive central light redistribution point (the hub) that collects the synchronized signals from all nodes and broadcasts this combined data stream to all nodes. However OTDM systems based on the principle of multiple, synchronized light pulse sources can support a much wider range of interconnect topologies, that can have greater number of nodes, have localized regions that re-use the same channel multiple times to achieve more bandwidth, have no single failure points (even if this point is only a purely passive start-coupler), or that have a wider range.

The basic element to support other topologies are relay nodes that do not receive their own transmission. The most basic form to show this principle is the case of two nodes connected directly to each other without a star-coupler. This is really the case of a two-node ring: each node can only receive the data sent by the other node. To achieve synchronization, the round-trip stabilization process is omitted and each node is locking only to the synchronization pulses of the other node. Convergence and stability for this topology depend on spectral radius for the connectivity matrix, which is no longer diagonally symmetric, to be less or equal to 1. While this is not true for any arbitrary topology, most interesting topologies are compatible with this constraint. For example rings with more than 2 nodes.

The family of topologies that can be supported in this manner are collections of star-couplers interconnected with relay-nodes. Each start-coupler can support a fully interconnected cluster of nodes that can exchange data freely among themselves. Communication between these clusters requires relay nodes to actively receive data and send it out to the next cluster. Since data do not pass through a relay node optically (rather it is received and then transmitted), the bandwidth of a relay node is limited to that of one or more channels that are processed electronically.

Optically transparent relay nodes are restricted to cases where data are passed from one cluster to another cluster but not vice versa because bidirectional, optically transparent connections would otherwise create optical cycles which would create interference and cross-talk. Hence, optically transparent relays, potentially with optical amplification to overcome light budget limitations, are useful only with asymmetric traffic requirements, for example the distribution of one data source to many consuming client-nodes.

The synchronization procedure for a system with relay nodes requires that these relay node synchronize first and that the local nodes within a cluster lock onto the synchronizations pulses of the relay nodes.

Advantages

Figure 4:
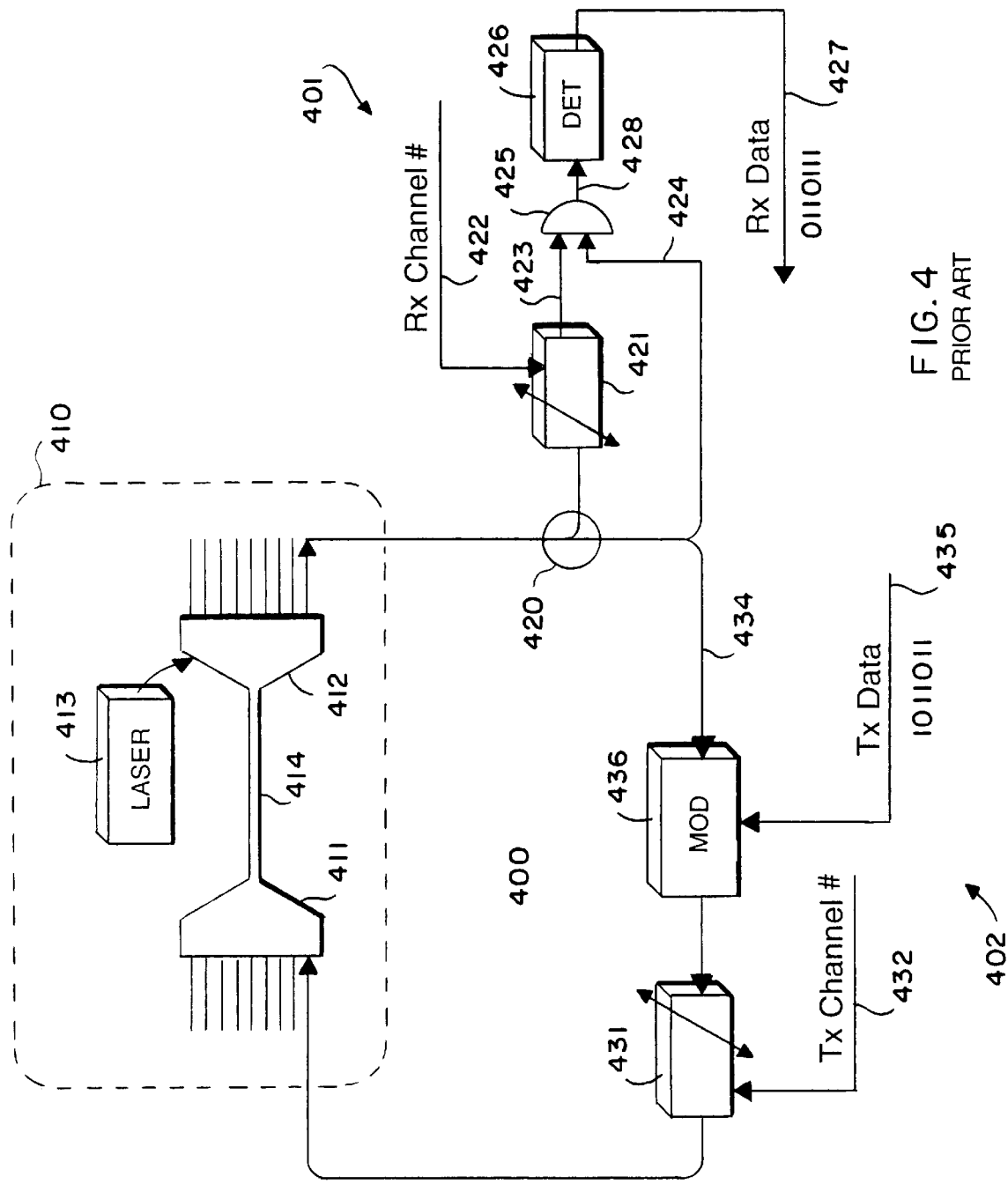
FIG. 4 is a schematic of a prior art system that produces the signal of FIG. 3.

The disclosed system uses a new OTDM architecture as depicted in FIGS. 5a or 5b. This architecture does not require a central, common optical pulse source like prior art OTDM architectures as depicted in FIG. 4. The present architecture also includes the methods to acquire and maintain global synchronization of all local pulse sources.

The advantages of this innovation are numerous. There is no need for a central optical pulse source. This minimizes the up front cost for an OTDM system. The central hub is a purely passive device that requires no power and has a very low probability of failure. In fact, a network can be configured without a hub by directly connecting nodes to each other as shown in FIG. 5b. Nodes do not need to separate a framing pulse from data, which improves signal to noise ratio and lowers cost. The local optical pulse source only need to drive the local optical AND gate and the transmitter. Hence it can operate at much lower power than the centralized pulse source of prior art OTDM systems.

With the present invention it is possible to implement local networks of nodes concurrently transmitting and receiving on several hundred channels at bit rates in the Tera-Hertz range.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

I claim:

1. A system for communicating optically encoded data among a network of nodes where the nodes are connected to each other by optical transmit and receive fibers and each node comprises:

a laser means for generating pulses;

a transmitter, connected to a transmit fiber, for selectively delaying the generated pulses into a plurality of time multiplexed channels;

an optical delay element connected to a receive fiber;

receiving means [for receiving], connected to the optical delay element, for selectively detecting the pulses in the time multiplexed channels, and means for globally synchronizing all of the pulses of all of the nodes in all of the time multiplexed channels in frequency and phase.

2. The system of claim 1 including a first node and a second node, the transmitter of the first node being directly connected to the receiver of the second node, and the transmitter of the second node being directly connected to the receiver of the first node.

3. The system of claim 1 including a hub having an input side connected to the transmit fibers of the nodes, and an output side connected to the receive fibers of the nodes, the hub being configured as a passive power splitter for equally distributing the pulses from the transmit fibers to the receive fibers.

4. The system of claim 1 wherein the optical delay element is a Piezo-electric fiber stretcher for mechanically lengthening or shortening a portion of an optical fiber in response to a phase control signal produced by the receiver.

5. The system of claim 4 wherein each of the time multiplexed channels has an associated width, and wherein the phase control signal causes the stretcher to vary the delay of the pulses by at least the width of one of the time multiplexed channels.

6. The system of claim 1 wherein a rate at which the pulses are generated by the laser is controlled by a crystal oscillator connected to the laser, wherein the receiver generates a frequency control signal for controlling the rate at which the pulses are generated.

7. The system of claim 1 wherein each receiver comprises:

a first delay unit, connected to the optical delay element, for selecting one of the time multiplexed channels;

an AND gate having a first input connected to the first delay unit and a second input connected to the laser, and a detector, connected to the output of the AND gate, for converting the selectively detected pulses to a receive electronic signal.

8. The system of claim 1 wherein each transmitter comprises:

a modulator, connected to the laser, for modulating the pulses according to a transmit electronic signal; and a second delay unit, connected to an output of the modulator, for selectively inserting the modulated pulses into the time multiplexed channels.

9. The system of claim 1 wherein a total bit rate of the system is equal to the number of the time multiplexed channels multiplied by a rate at which the pulses are generated.

10. The system of claim 1 wherein each node further comprises;

means for achieving global synchronization from a random state during an initialization phase of the system; and means for maintaining global synchronization during a stable operational phase of the system.

11. The system of claim 10 wherein one of the plurality of time multiplexed channels is a reserved channel for carrying synchronization pulses.

12. The system of claim 11 wherein each node sequentially contributes a single synchronization pulse on a periodic schedule such that for a system with N nodes, each node transmits a synchronization pulse on the reserved channel no more than once every N bit-periods.

13. The system of claim 12 wherein the means for maintaining global synchronization during a stable operational phase of the system further comprises:

means for measuring first and second intensity values of one of the synchronization pulses while dithering the phase control signal, the measuring being separated by a predetermined amount of time that is less than the width of the synchronization pulse; and means for comparing the first and second light values to determine the sign and magnitude of a phase correction signal to be added to the phase control signal to stabilize the phase of synchronization pulses.

14. The system of claim 13 wherein each said node measures and compares synchronization pulses generated by said node and at least one other node.

15. The system of claim 14 including means for maintaining a phase monitoring graph in a memory accessible by the nodes, the phase monitoring graph having vertices and directed edges, each vertex representing one of the nodes, and each directed edge representing a measuring relationship between mutual represented nodes.

16. The system of claim 15 wherein the phase monitoring graph is strongly connected and symmetric while the system is operating, and means for stabilizing mutual nodes using a distributed phase locked-loop and the phase monitoring graph.

17. The system of claim 12 wherein the synchronization pulses on the reserved channel are generated at a predetermined rate that is less than the rate at which the pulses are generated.

18. The system of claim 12 including means for detecting variations from the predetermined rate at which synchronization pulses are detected on the reserved channel to determine variations in the number of connected nodes while operating the system.

19. The system of claim 12 wherein the means for acquiring global synchronization from a random state during an initialization phase further comprises:

means for locating the nodes of the system; and means for closing a distributed phase-locked loop.

20. The system of claim 19 wherein each node further comprising:

means for generating a random sequence of synchronization pulses on the reserved channel; and means for selecting each of the time multiplexed channels in turn while dithering a phase control signal supplied to the optical delay element until the random sequence of synchronization pulses is detected to build a channel map.

21. The system of claim 20 wherein each node generates a unique random sequence of synchronization pulses.

22. The system of claim 21 wherein the frequency at which the synchronization pulses are generated by the laser is determined by a crystal oscillator controlled by a frequency control signal produced by the receiver, and wherein the means for locating nodes in the system further comprises:

means for generating the unique random sequence of synchronization pulses while randomly varying the frequency control signal;

means for selecting each of the time multiplexed channels in turn until the unique random sequences of at least two nodes are detected;

means for synchronizing the phase and frequency of the synchronization pulses of the at least two detected nodes; and means for exchanging identifications of the two detected nodes on a communications sub-channel of the time multiplexed channels.

23. The system of claim 22 including means for grouping detected nodes until all of the nodes of the system have been detected.

24. A method for communicating optically encoded data among a network of nodes, the nodes connected to each other by optical transmit and receive fibers, the method comprising the steps of:

locally generating laser pulses at each node;

selectively delaying the locally generated pulses;

transmitting the selectively delayed pulses via an optical signal transmitted on a transmit fiber, the optical signal having a plurality of time multiplexed channels;

receiving the optical delay signal including the pulses at an optical delay element via a receive fiber;

controlling the optical delay element to delay or advance the received optical signal by stretching an optical fiber:

selectively detecting the pulses in the time multiplexed channels; and globally synchronizing all of the pulses of all of the nodes in all of the time multiplexed channels in frequency and phase.

25. The method of claim 24 further comprising a step of equally distributing the pulses from the transmit fibers to the receive fibers using a hub having an input side connected to the transmit fibers of the nodes and an output side connected to the receive fibers of the nodes, the hubing configured as a passive power splitter.

26. The method of claim 24 further comprising the steps of:

acquiring global synchronization from a random state during an initialization phase of the system; and maintaining global synchronization during a stable operational phase of the system.

27. The method of claim 26 further comprising a step of transmitting synchronization pulses on a reserved channel of the time multiplexed channels.

28. The method of claim 27 wherein each node sequentially contributes a single synchronization pulse on a periodic schedule such that for a system with N nodes each node transmits a synchronization pulse on the reserved channel no more than once every N bit-periods.

29. The method of claim 28 further comprising the steps of:

measuring first and second intensity values of one of the synchronization pulses while dithering a phase control signal supplied to the fiber stretcher, the measuring being separated by a predetermined amount of time that is less than the width of the measured synchronization pulse; and comparing the first and second light values to determine the sign and magnitude of a phase correction signal to be added to a phase control signal to stabilize the phase of the pulses.

30. The method of claim 29 further comprising a step of locating the nodes of the system, and closing a distributed phase locked-loop.

* * * * *

UNITED STATES PATENT AND TRADEMARK OFFICE
CERTIFICATE OF CORRECTION

PATENT NO. : 6,262,823 B1
DATED : June 17, 2001
INVENTOR(S) : Andreas Georg Nowatzyk It is certified that error appears in the above-identified patent and that said Letters Patent is hereby corrected as shown below:

Column 17,
Line 65, reads "receiving means [for receiving], connected to the optical"; should read -- receiving means, connected to the optical --;

Column 20,
Line 31, reads "to the receive fibers of the nodes, the hubing configured as"; should read -- to the receive fibers of the nodes, the hub being configured as --;

Signed and Sealed this

Seventh Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,262,823 B1
DATED        : July 17, 2001
INVENTOR(S)  : Andreas Georg Nowatzyk It is certified that error appears in the above-identified patent and that said Letters Patent is hereby corrected as shown below:

Column 17,
Line 65, reads "receiving means [for receiving], connected to the optical"; should read -- receiving means, connected to the optical --;

Column 20,
Line 31, reads "to the receive fibers of the nodes, the hubing configured as"; should read -- to the receive fibers of the nodes, the hub being configured as --;

This certificate supersedes Certificate of Correction issued May 7, 2002.

Signed and Sealed this

Third Day of September, 2002

Attest:

Attesting Officer

JAMES E. ROGAN
*Director of the United States Patent and Trademark Office*